Dec. 13, 1955  D. G. FAUST ET AL  2,726,732
AIR LINE FILTER AND AUTOMATIC DRAIN VALVE
Filed July 17, 1952
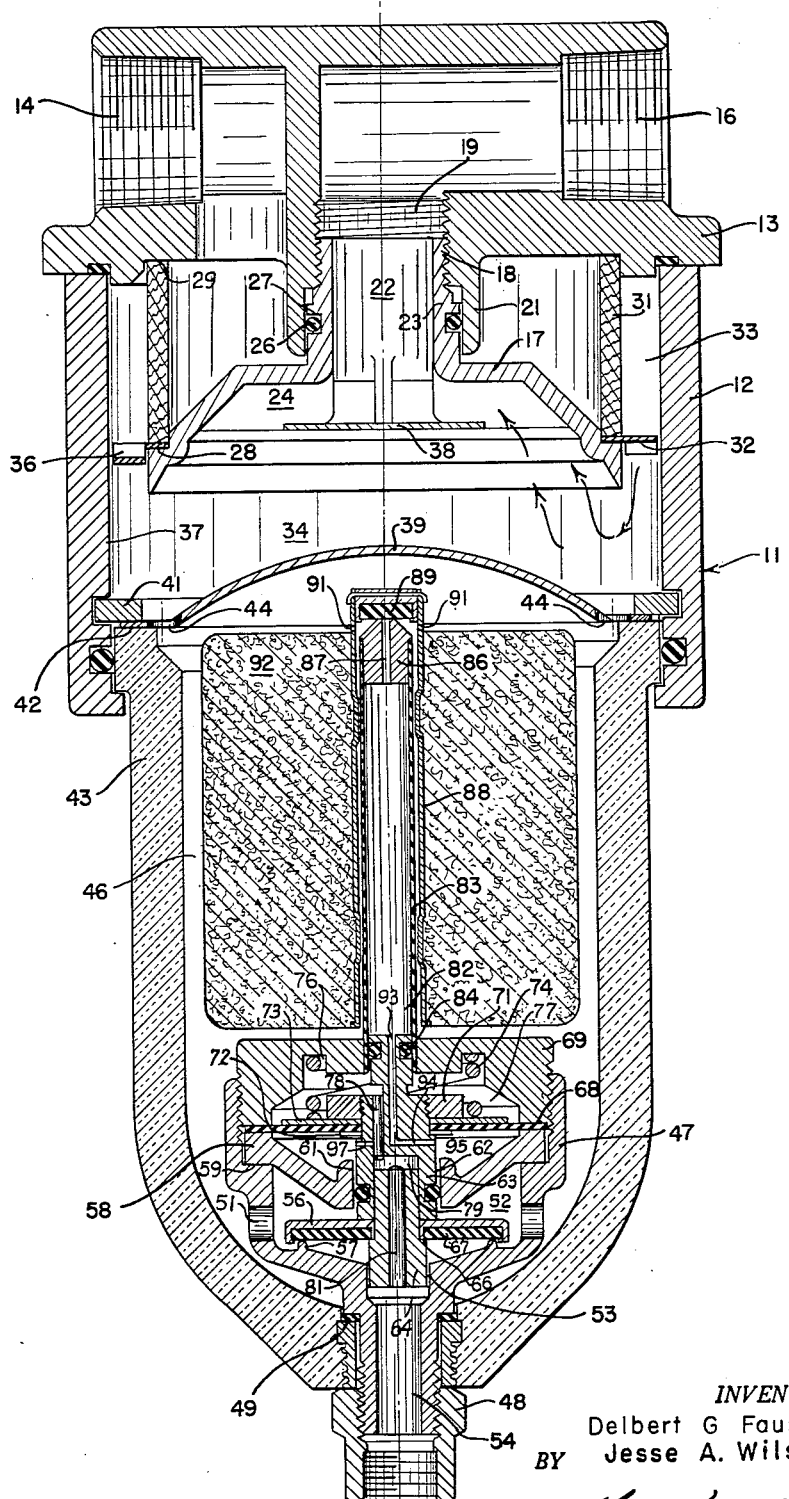
INVENTORS
Delbert G Faust &
BY  Jesse A. Wilson, Jr.
ATTORNEY

United States Patent Office 2,726,732
Patented Dec. 13, 1955

2,726,732

AIR LINE FILTER AND AUTOMATIC DRAIN VALVE

Delbert G. Faust and Jesse A. Wilson, Jr., Englewood, Colo., assignors to C. A. Norgren Company, Englewood, Colo., a corporation of Colorado Application July 17, 1952, Serial No. 299,320

10 Claims. (Cl. 183—42)

The present invention relates to an air line filter and automatic drain device for compressed gas conduits, and more particularly to a filter having incorporated therewith a float-operated automatic drain valve adapted to remove entrained foreign matter from a moving stream of gaseous fluid.

Included among the objects and advantages of the present invention is a device for removing foreign matter from a stream of gas under pressure passing through a conduit to various points of use. One important function of the device is the removal of entrained liquid from the stream of gas as it passes through the conduit. The device is especially valuable for removing entrained water and other liquids from compressed air lines, and to automatically discharge accumulated liquids from the compressed air system with a minimum loss of air. The device provides means for removing entrained liquid from the gas stream and provides a storage reservoir for retaining the separated liquid. The device also provides a float-operated drain valve which quickly and efficiently discharges the collected liquid only when a sufficient amount of liquid has been accumulated.

Another object of the present invention is to provide a device which removes solid foreign matter from the gas stream as well as entrained liquid.

A further object is to provide a float member in the storage reservoir, movement of which will actuate a control valve thereby admitting gas under pressure into the valve mechanism to facilitate opening of the drain valve and the consequent discharge of the liquid collected therein.

A still further object of the invention is to provide an automatic drain valve which operates effectively either under static or dynamic conditions. That is, the drain valve mechanism will discharge accumulated liquid when the system is under pressure but no gas is moving therethrough, as well as when gas is moving through the system. This function is valuable where a compressed gas system is idle over a period of time, but is retained under pressure. With the device of the invention installed in such a pressure system, accumulated condensed moisture will be discharged during the idle time, whereby the system is always ready for immediate use.

Further objects and advantages of the present invention will be apparent from the appended description and drawing, in which Figure 1 is a cross section elevation taken along the center line of a device made in accordance with the present invention.

Briefly stated, the present invention provides a device for separating foreign matter from a flowing gas or air stream by means of the combined use of a filter element for initially separating solid foreign matter and vortex creating means for separating entrained liquid. Further, the device provides a storage reservoir for collection of the separated liquid, and an integral float-operated drain valve, for automatically discharging the collected liquid from the gas system.

The device of the present invention may be more fully understood by reference to the following detailed description. In the single figure of the drawing the automatic drain filter generally shown, by reference number 11, is provided with a main body 12 which houses the filter and the liquid separating mechanisms of the device. A filter head 13, secured to the body, provides an inlet 14 and an outlet 16 for connecting the device into a gas-carrying conduit.

The filter head has an axially aligned boss 21 having a partially tapped passage 19 therethrough, providing an egress from the filter body to the outlet. A baffle member 17, secured in the passage by a threaded portion 18 of the baffle extension 23, has a passage 22 therethrough to provide an exit for air from the baffle chamber 24 to the outlet. An O ring seal 26, seated in groove 27 on extension 23, provides an air-tight seal between the baffle and the filter head.

A filter element 31, positioned between the filter head and the periphery of the baffle is securely held by a shoulder 28 on the baffle and a juxtaposed recess 29 in the filter head. Preferably, the filter element is made of sintered bronze; however, a wire mesh screen or the like is satisfactory. A flow directing plate 32 is positioned in a cylindrical passage 33 between the filter element 31 and the filter body 12. The plate rests on shoulder 28, being held thereon by the filter element. The plate has a plurality of holes with attached directional vanes 36, adapted to direct air passing through the filter into a circular path down along wall 37 of the vortex chamber 34. A dome-shaped plate 39 substantially closes the bottom of the filter body, and provides a smooth surface for deflecting air toward the outlet. This plate is provided to aid in smoothly reversing the flow of air in the vortex chamber, as turbulence at this point would tend to pick up minor liquid particles which adhere to the bottom of the vortex chamber.

The direction of egress of air from the vortex chamber is upwardly through passage 22, and a baffle disc 38 adjacent the passage prevents a long straight sweep of air from the vortex chamber to the outlet. This baffle laterally deflects the stream of air to help break up any carry-over of entrained matter.

The plate 39 is retained in position against a retaining ring 41 by a bowl 43. The plate has a plurality of holes 44 positioned about the periphery thereof. The holes provide passage for the separated liquid from the vortex chamber to the interior of the bowl or reservoir 46.

Any liquid that accumulates in the reservoir is discharged from the system by a drain valve which is controlled by both a float-operated mechanism and a diaphragm. The valve is supported within the reservoir by a valve housing 47. The valve housing is juxtaposed within the reservoir, and is retained in position by an adapter 48 on the tubular outlet 54 of the housing. The outlet is normally connected with a drainage system which is under atmospheric pressure. The housing seats on a gasket 49, and is held tightly thereagainst by the adapter. The housing has a plurality of openings 51 disposed about the periphery thereof, adapted to admit accumulated water from the reservoir into the valve chamber 52 of the housing.

The housing has a raised seat 57 extending a short distance into the valve chamber. A valve retainer 56, backing a valve disc 67, is adapted to open and close the outlet of the housing. A valve stem 63 passes through the valve retainer, and has a short portion 64 extending downwardly beyond the retainer. The outlet 54 has an enlarged inlet 53, adapted as a guide for the valve stem extension 64. The valve stem extension has a square cross section, so that there is a passage at all times between the extension and the inlet.

The valve retainer is retained in position, abutting shoulder 66, by the valve stem 63. For convenience, the valve stem is made in two parts, lower stem portion 64 being a forced fit into upper stem portion 63, with the valve retainer secured therebetween.

A seal ring 58, positioned on shoulder 59 of the housing, encircles the valve stem, and an O ring seal disposed between axial boss 61 and the stem permits reciprocal movement therebetween and remains sealed against passage of air. A diaphragm 68 is secured to the stem between an upper and lower backing plate 73 and 72 respectively by a clamp nut 71. The periphery of the diaphragm seats on the seal ring, and is held in position by a valve housing cap 69. A light spring 74 abuts the diaphragm backing plate 73, and provides a light force to hold the valve disc against the seat. The valve cap has an upwardly extending tube 83 into which extends a short portion of the valve stem. An O ring seal 84 seals the tube from the spring chamber 77 above the diaphragm. The diaphragm is a flexible disc adapted to permit reciprocable movement of the valve stem by distortion thereof, and is preferably made of a synthetic rubber such as Neoprene, et cetera.

The valve stem has a vertical passage 93 and a connecting lateral passage 94 for communication between the diaphragm chamber 95 and the passage 82. These passages provide an air duct for pressurizing chamber 95 and subsequently opening the valve. A series of passages is provided in the stem to prevent a build-up of pressure in the spring chamber, and, hence, prevent the operation of the valve. The series of passages 78, 79, and 81 bleed directly into outlet 54, so that the spring chamber remains substantially at atmospheric pressure.

A float 92 is disposed on tube 83 to permit free reciprocal movement. The float is preferably made of cellular rubber; however, any suitable type of float may be used. The float has an axial tubular insert 88 telescoped over tube 83, adapted to permit free movement of the float in relation to the tube. The insert 88 extends beyond the float and is closed at the upper end by a valve 89 pinned thereon. The valve has an integral seat adapted to seal the end of tube 83 when the float is in normal or non-floating position. The tube 83 has an insert 86, providing a seating surface for valve 89 and a lateral passage 87. Radial openings 91 in the extended insert 88 provide access to the valve mechanism for the pressurized air in the system when the float is lifted.

In operation, the device is connected, for example, into a compressed air conduit by means of inlet 14 and outlet 16. The stream of compressed air flows through the inlet passage into the filter chamber and through the filter element 31. Any entrained solid matter is retained in the filter chamber out of contact with the valve mechanism. Air passes through the filter element into cylindrical chamber 33, and then through the openings of dierctional guide plate 32. The guide plate forces the air circularly downwardly along the wall of the vortex chamber 34. Entrained moisture is thrown against the wall by the passage of the air, and the separated water flows into the reservoir 46 via holes 44 in plate 39. The resulting cleaned air exhausts around baffle 38 through passage 22, and into the conduit through outlet 16.

The reservoir 46 is completely pressurized as it is in open communciation with the vortex chamber. The spring chamber 77, however, is under atmospheric pressure as it is directly connected to the outside by means of the series of bleed passages 78, 79, and 81. Diaphragm chamber 95 is likewise under atmospheric pressure, when the float valve 89 is closed, due to a small metering orifice 97 conected into bleed passage 78.

When a sufficient amount of water is accumulated in the reservoir, the float rises, opening passage 87 which permits compressed air to enter passage 82. The compressed air flows through passages 93 and 94 into chamber 95 under the diaphragm. Pressure in the chamber 95 rapidly builds up, until it overcomes the downward spring force on the diaphragm, and the pressure differential across valve 56, causing the diaphragm to displace upwardly, compressing the spring. As the diaphragm moves upwardly it carries valve stem 63 along with it. The valve retainer 56 and valve disc 67 are thus lifted from the valve seat 57, and the accumulated water is forced out both by gravity and the air pressure in the reservoir. Water in the reservoir has access to the valve through passages 51, and the water is normally discharged down to a level of substantially the bottom of the passages 51. The water is rapidly exhausted from the reservoir, and the float returns to normal non-floating position, closing passage 87. The metering orifice 97 provides means for reducing the pressure in the diaphragm chamber. The orifice has a smaller cross sectional area than passages 87, 93, and 94, whereby air enters the diaphragm chamber at a faster rate than the escape through the orifice 97. Therefore, pressure builds up in the diaphragm chamber, overcoming the spring tension and the pressure differential across the valve 56 displacing the diaphragm. When the passage 87 is closed, no more air enters the diaphragm chamber, but the air in the chamber continues to bleed out. When the force available from the pressure in the diaphragm chamber is thus reduced below the spring tension and the pressure differential across the drain valve 56, the diaphragm is returned to its undistended position. The return movement of the diaphragm returns the drain valve to the seat. Air in chamber 95 continues to bleed out after the drain valve is closed until it is in equilibrium with atmospheric pressure. The valve is then ready for another discharge cycle. The drain valve provides a barrier between the pressure in the reservoir and atmospheric pressure in the outlet, so that there is a pressure differential across the drain valve whether it is open or closed. The pressure differential across the closed drain valve must be overcome to open the valve. When the drain valve is open there is still a pressure differential between the bowl and the outlet, and the pressure difference closes the drain valve when pressure in chamber 95 is reduced. The spring 74 is provided as an initial actuating force on the diaphragm; therefore, only a light spring is necessary. The actual draining operation occurs in a fraction of a second; consequently, the loss of air pressure from the system is negligible.

From the foregoing description, it will be apparent that the present invention incorporates many advantageous features of a useful nature. It will be observed that some of these features are adaptable to various modifications and changes and to other uses. All such modifications and changes as are within the scope of the hereunto appended claims are deemed to be a part of this invention.

What is claimed is:

1. In a compressed gas filter having means for separating liquid from the gas and having storage means for accumulating a quantity of the separated liquid, the improvement which comprises an automatic drain valve in said storage means including a diaphragm housing juxtaposed in said storage means, a diaphragm in and dividing said housing into an upper and a lower compartment, the upper compartment being maintained at substantially atmospheric pressure, a valve for closing a liquid outlet for said storage means, means interconnecting said diaphragm and said valve, a float adapted to rise and fall with accumulated liquid, a float valve associated with said float to pass compressed gas, means for conveying said compressed gas at a predetermined rate from said float valve to said lower chamber to open said valve, and means for continuously bleeding pressurized gas from said lower chamber at a rate less than incoming gas to close said valve when said float valve is closed.

2. In a compressed gas filter having means for separating liquid from the gas and having storage means for accumulating a quantity of the separated liquid, the improvement which comprises an automatic drain valve in said storage means including a diaphragm housing juxtaposed in said storage means, a diaphragm in and dividing said housing into an upper and a lower compartment, the upper compartment being maintained at substantially atmospheric pressure, a valve for closing a liquid outlet for said storage means, means interconnecting said diaphragm and said valve, a float juxtaposed in said storage means above said housing adapted to rise and fall with accumulated liquid, a float valve associated with said float to pass pressurized gas, means including a passage extending through said diaphragm for conveying said pressurized gas at a predetermined rate from said float valve to said lower chamber to open said valve, and orifice means for continuously bleeding pressurized gas from said lower chamber at a rate less than incoming gas to close said valve when said float valve is closed.

3. In a compressed gas filter having means for separating liquid from the gas and having storage means for accumulating a quantity of the separated liquid, the improvement which comprises an automatic drain valve internal of said storage means including a diaphragm housing providing a diaphragm chamber disposed in said storage means, a diaphragm in said chamber dividing the same, a drain valve for controlling elimination of liquid from said storage means, a valve stem interconnecting said drain valve and said diaphragm, an extension extending beyond said diaphragm housing, said extension having a passage therethrough adapted to conduct pressurized gas to said diaphragm chamber on one side of said diaphragm, a spring disposed in said diaphragm chamber on the opposite side of said diaphragm for normally holding said diaphragm and drain valve in closed position, a slide tube mounted for reciprocal movement along said extension, a float member mounted on said slide tube, and a float valve actuated by said slide tube for normally closing off the passage through said extension, said device being operative when sufficient liquid has accumulated in said container to raise the float, thereby admitting pressurized gas into said diaphragm chamber causing movement of said diaphragm to open said drain valve for elimination of accumulated liquid.

4. In a compressed gas filter having means for separating liquid from the gas and having storage means for accumulating a quantity of the separated liquid, the improvement which comprises an automatic drain valve internal of said storage means including a diaphragm housing providing a diaphragm chamber disposed in said storage means, a diaphragm in said chamber dividing said chamber into upper and lower compartments, a drain valve for controlling elimination of liquid from said storage means, a valve stem interconnecting said drain valve and said diaphragm, an extension extending beyond said diaphragm housing, said extension having a passage therethrough adapted to conduct pressurized gas to said lower compartment, a regulating spring disposed in said upper compartment for normally holding said diaphragm and drain valve in closed position, a slide tube mounted for reciprocal movement along said extension, a float member mounted on said slide tube, and a float valve actuated by said slide tube for normally closing off the passage through said extension, said device being operative when sufficient liquid has accumulated in said container to raise the float, thereby admitting pressurized gas into said diaphragm chamber causing movement of said diaphragm to open said drain valve for elimination of accumulated liquid.

5. In a compressed gas filter having means for separating liquid from the gas and having storage means for accumulating a quantity of the separated liquid, the improvement which comprises an automatic drain valve, said storage means including a diaphragm housing providing a diaphragm chamber disposed in said storage means, a diaphragm in said chamber dividing said chamber into upper and lower compartments, a drain valve for controlling elimination of liquid from said storage means, a valve stem interconnecting said drain valve and said diaphragm, an extension extending beyond said diaphragm housing, said extension having a passage therethrough adapted to conduct pressurized gas to said lower compartment, a regulating spring disposed in said upper compartment for normally holding said diaphragm and drain valve in closed position, a slide tube mounted for reciprocal movement along said extension, a float member mounted on said slide tube, a float valve actuated by said slide tube for normally closing off the passage through said extension, said device being operative when sufficient liquid has accumulated in said container to raise the float, thereby admitting pressurized fluid into said lower compartment causing movement of said diaphragm to open said drain valve for elimination of accumulated liquid, and bleed means from said lower compartment to release pressurized gas for closing said drain valve when said float valve is closed.

6. In a compressed gas filter having means for separating liquid from the gas and having storage means for accumulating a quantity of the separated liquid, the improvement which comprises an automatic drain valve disposed in said storage means for periodically eliminating stored liquid including a diaphragm housing juxtaposed in said storage means, a diaphragm in and dividing said housing into an upper and lower compartment, said upper compartment being maintained at substantially atmospheric pressure, a drain valve for controlling elimination of accumulated liquid, means interconnecting said diaphragm and said valve whereby movement of said diaphragm moves said valve, a float adapted to rise and fall with accumulated liquid, a float valve associated with said float adapted to pass pressurized gas at a predetermined rate, means for conveying gas from said float valve to said lower compartment to actuate said diaphragm, means for continuously bleeding said lower compartment at a rate less than the incoming gas whereby to lower the pressure in said lower compartment to substantially atmospheric pressure when said float valve is closed, and spring means in said upper compartment adapted to close said valve when said lower compartment is not under the influence of the pressurized gas.

7. In a compressed gas filter having means for separating liquid from the gas or accumulating a quantity of the separated liquid, the improvement which comprises an automatic drain valve in said storage means for periodically eliminating stored liquid including a diaphragm housing juxtaposed in said storage means, a diaphragm in and dividing said housing into an upper and lower compartment, a valve for closing an outlet for said storage means, valve stem means interconnecting said diaphragm and said valve whereby movement of said diaphragm moves said valve, passage means associated with said valve stem means for maintaining said upper compartment at substantially lower pressure than said storage means, a float adapted to rise and fall with accumulated liquid, a float valve associated with said float adapted to pass pressurized gas, means inclusive of a guide tube for said float adapted to convey gas from said float valve to said lower compartment to actuate said diaphragm, orifice means for bleeding said lower compartment whereby to lower the pressure in said lower compartment to substantially lower pressure than said storage means when said float valve is closed, and spring means in said upper compartment adapted to close said valve when said lower compartment is not under the influence of the pressurized gas.

8. In a compressed gas filter having means for separating liquid from the gas and having storage means for accumulating a quantity of the separated liquid, the improvement which comprises an automatic drain valve in said storage means including a diaphragm housing juxtaposed in said storage means, a diaphragm in and dividing said housing into an upper and a lower compartment, the upper compartment being maintained at substantially atmospheric pressure, a valve projection for closing a liquid outlet for said storage means, means for constricting the outlet beyond said valve for throttling the outlet to decrease the pressure differential across said valve by throttling escape of liquid, means interconnecting said diaphragm and said valve, a float juxtaposed in said storage means above said housing adapted to rise and fall with accumulated liquid, a float valve associated with said float to pass pressurized gas, means including a passage extending through said diaphragm for conveying said pressurized gas at a predetermined rate from said float valve to said lower chamber to open said valve, and orifice means for continuously bleeding pressurized gas from said lower chamber at a rate less than the incoming gas to close said valve when said float valve is closed.

9. In a compressed gas filter having means for separating liquid from the gas and having storage means for accumulating a quantity of the separated liquid, the improvement which comprises an automatic drain valve internal of said storage means including a diaphragm housing providing a diaphragm chamber disposed in said container, a diaphragm in said chamber dividing the same, a drain valve controlling elimination of liquid from said storage means, means extending from said valve into said liquid outlet for constricting the outlet and throttling liquid exhausting through said valve whereby the pressure differential across said valve is decreased on opening said valve, a valve stem interconnecting said drain valve and said diaphragm, an extension extending beyond said diaphragm housing, said extension having a passage therethrough adapted to conduct pressurized gas to said diaphragm chamber on one side of said diaphragm, a spring disposed in said diaphragm chamber on the opposite side of said diaphragm for normally holding said diaphragm and drain valve in closed position, a slide tube mounted for reciprocal movement along said extension, a float member mounted on said slide tube, and a float valve actuated by said slide tube for normally closing off the passage through said extension, said device being operative when sufficient liquid has accumulated in said container to raise the float, thereby admitting pressurized gas into said diaphragm chamber causing movement of said diaphragm to open said drain valve for elimination of accumulated liquid.

10. In a compressed gas filter having means for separating liquid from gas and having storage means for accumulating a quantity of the separated liquid, the improvement which comprises an automatic drain valve internal of said storage means including a diaphragm housing providing a diaphragm chamber disposed in said storage means, a diaphragm in said chamber dividing the same into upper and lower compartments, a drain valve for eliminating accumulated liquid from said storage means, a valve stem operably interconnecting said drain valve and said diaphragm, means for maintaining said upper compartment under substantially atmospheric pressure, means inclusive of a float operated valve and an orifice for introducing gas at a predetermined rate from said storage means into said lower compartment when sufficient liquid has accumulated to raise the float, and means inclusive of an orifice open to the atmosphere for releasing gas from said lower compartment at a rate less than incoming gas whereby sufficient gas under pressure may be accumulated in said lower compartment to open said drain valve when said float valve is open and release gas under pressure at a predetermined rate after said float valve is closed.

References Cited in the file of this patent

UNITED STATES PATENTS

| | | |
|---|---|---|
| 651,012 | Guild | June 5, 1900 |
| 1,533,835 | Dawley | Apr. 14, 1925 |
| 1,784,664 | Eickholt | Dec. 9, 1930 |
| 2,393,119 | Paasche | Jan. 15, 1946 |
| 2,510,049 | Neeson | May 30, 1950 |